US010162977B2

United States Patent
Toillon et al.

(10) Patent No.: US 10,162,977 B2
(45) Date of Patent: Dec. 25, 2018

(54) SYSTEM FOR SECURING THE CRITICAL DATA OF AN ON-BOARD AIRPLANE SYSTEM OF AN AIRCRAFT

(71) Applicant: THALES, Neuilly sur Seine (FR)

(72) Inventors: Patrice Georges Paul Toillon, Meudon la Foret (FR); Hicham Agrou, Meudon la Foret (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/773,523

(22) PCT Filed: Mar. 7, 2014

(86) PCT No.: PCT/EP2014/054464
§ 371 (c)(1),
(2) Date: Apr. 28, 2016

(87) PCT Pub. No.: WO2014/135683
PCT Pub. Date: Sep. 12, 2014

(65) Prior Publication Data
US 2016/0246980 A1    Aug. 25, 2016

(30) Foreign Application Priority Data
Mar. 7, 2013   (FR) ..................................... 13 00517

(51) Int. Cl.
*G06F 21/62*   (2013.01)
*G06F 21/60*   (2013.01)

(52) U.S. Cl.
CPC .......... *G06F 21/6218* (2013.01); *G06F 21/60* (2013.01); *G06F 21/604* (2013.01); *G06F 21/62* (2013.01); *G06F 2221/2143* (2013.01)

(58) Field of Classification Search
CPC ............ G06F 2221/2143; G06F 21/62; G06F 21/6218; G06F 21/60; G06F 21/604
See application file for complete search history.

(56) References Cited

U.S. PATENT DOCUMENTS

| 5,559,505 | A | * | 9/1996 | McNair | .............. | G07C 9/00142 340/11.1 |
| 6,324,537 | B1 | * | 11/2001 | Moran | .................... | G06F 21/32 707/758 |
| 2008/0162784 | A1 | * | 7/2008 | Obereiner | ............... | G06F 21/53 711/103 |

(Continued)

FOREIGN PATENT DOCUMENTS

| CN | 101896914 A | 11/2010 |
| EP | 2204753 A2 | 7/2010 |
| WO | 2006/069274 A2 | 6/2006 |

*Primary Examiner* — Thaddeus J Plecha
(74) *Attorney, Agent, or Firm* — Thompson Coburn LLP

(57) ABSTRACT

A data security system for securing the critical data of an on-board airplane avionics system comprising access control means for controlling access to the said data on the basis of the security related information of a user, wherein the security related information is selected from the group consisting of: a list of authorised users; a maximum number of allowed accesses, as well as the types of allowed accesses; a time window allowed for access; a series/concatenation allowed for access, by various different users; and a hierarchical prioritisation of the zones associated with the data storage means.

12 Claims, 1 Drawing Sheet

(56) References Cited

U.S. PATENT DOCUMENTS

| | | | | |
|---|---|---|---|---|
| 2009/0119468 A1* | 5/2009 | Taylor | ............ | G06F 21/88 |
| | | | | 711/166 |
| 2010/0235567 A1* | 9/2010 | Perroud | ............ | G06F 21/554 |
| | | | | 711/103 |
| 2012/0311722 A1* | 12/2012 | Wang | ............ | H04L 63/0861 |
| | | | | 726/28 |
| 2013/0198819 A1* | 8/2013 | Gordon | ............ | G06F 21/31 |
| | | | | 726/5 |

* cited by examiner

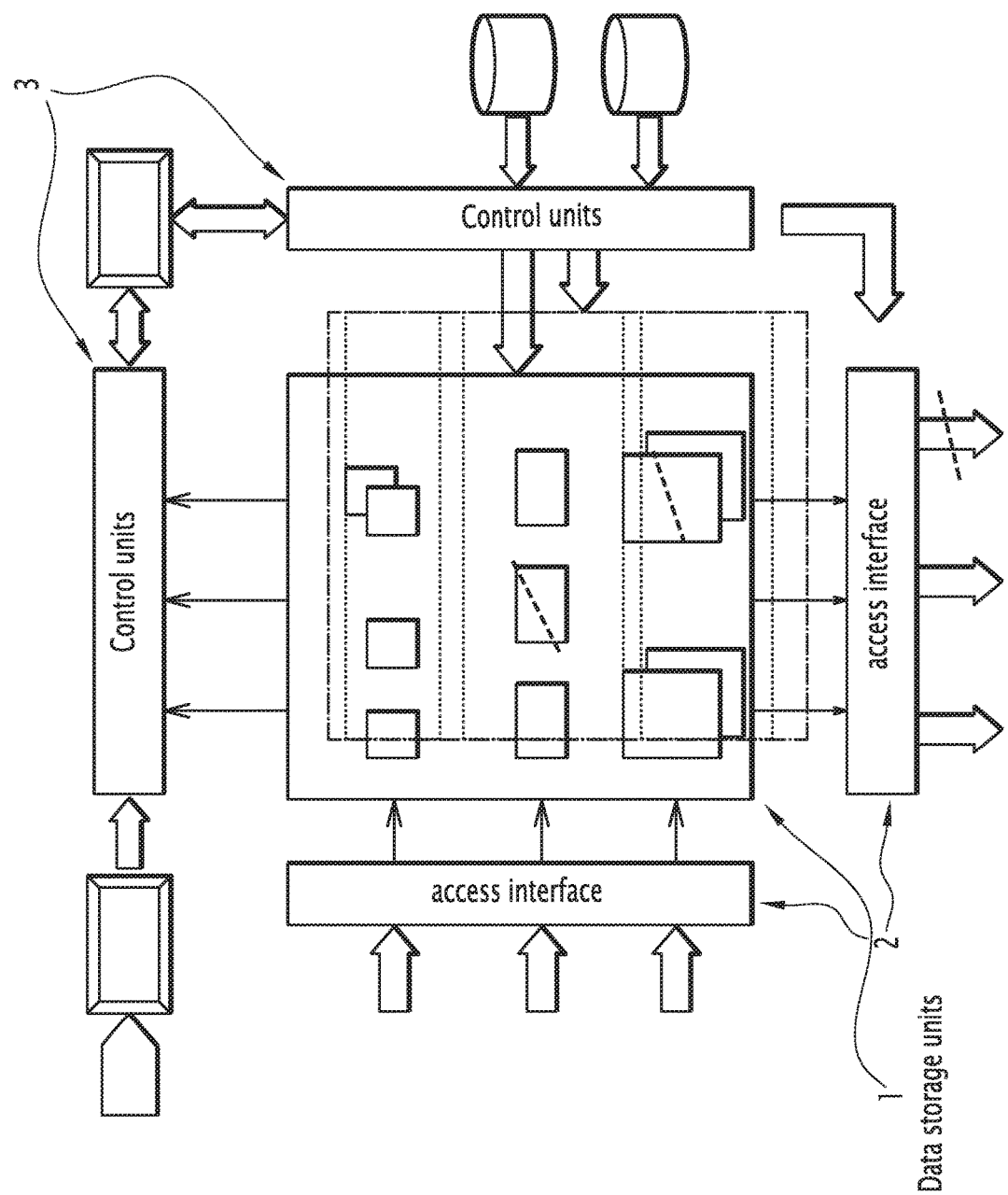

SYSTEM FOR SECURING THE CRITICAL DATA OF AN ON-BOARD AIRPLANE SYSTEM OF AN AIRCRAFT

BACKGROUND OF THE INVENTION

CROSS-REFERENCE TO RELATED APPLICATIONS

This application is a U.S. National Phase application of PCT/ET2014/054464, filed on Mar. 7, 2014, claiming the benefit of FR Application No. FR 13 00517, filed Mar. 7, 2013, both of which are incorporated herein by reference in their entireties.

The present invention relates in a general sense, to a system for securing data.

More particularly, the invention relates to a data security system for securing the critical data of an on-board airplane avionics system installed aboard an aircraft, the critical data being stored in the data storage means of this system.

It is known that systems of such type include the access control means for controlling access to the said data, for/by at least one user, such as to validate or invalidate access to the said data on the basis of the security related information thereof.

Indeed, access to this type of critical data for an avionics system must be managed and secured to the maximum, because such type of data is extremely sensitive for the aircraft and in particular for the flight safety thereof.

The objective of the invention is thus to further improve the security of these data and information and therefore in a general manner enhance the security and safety of aircraft.

SUMMARY OF THE INVENTION

To this end, the object of the invention is related to a data security system for securing the critical data of an on-board airplane avionics system installed aboard an aircraft, the critical data being stored in the data storage means, which comprises the access control means for controlling access for/by at least one user to the said data for validate or invalidate access to the said data on the basis of the security related information thereof, characterised in that the security related information is selected from within a group including, inter alia:
  a list of authorised users allowed to access the data;
  a maximum number of allowed accesses to these data, as well as the types of allowed accesses to the said data;
  a time window, having a limited allowed duration for access to the said data;
  a series/concatenation allowed for access, by various different users, to the said data;
  a hierarchical prioritisation of the zones associated with the data storage means.

Based on other characteristic features of the system according to the invention taken into consideration individually or in combination:
  the data storage means are organised:
    by associated discrete elementary zone(s) wherein each one thereof is associated with a message; or
    in the form of different contiguous zones wherein each one thereof is associated with a range of addresses of the data storage means;
  the security related information of the group and/or the group of security related information may be:
    totally static with a preconfiguration and a preinitialisation; or
  modified dynamically in accordance with the conditions of access to each of the zones thereby providing for a dynamic management system appropriately adapted to the detection of instances of non-compliance with the conditions or of non-compliant access attempts; or
  evolving over time;
it includes the data alteration means for the temporary or permanent alteration of data in the event of non-compliance with the conditions of access or access attempts that are non-compliant with the conditions of access noted above including, inter alia:
  a list of authorised users allowed to access the data;
  a maximum number of allowed accesses to these data, as well as the types of allowed accesses to the said data;
  a time window, having a limited allowed duration for access to the said data;
  a series/concatenation allowed for access, by various different users, to the said data;
  a hierarchical prioritisation of the zones associated with the data storage means;
it includes the data deletion means for the temporary or permanent deletion of data in the event of non-compliance with the conditions of access or access attempts that are non-compliant with the conditions of access noted above including, inter alia:
  a list of authorised users allowed to access the data;
  a maximum number of allowed accesses to these data, as well as the types of allowed accesses to the said data;
  a time window, having a limited allowed duration for access to the said data;
  a series/concatenation allowed for access, by various different users, to the said data;
  a hierarchical prioritisation of the zones associated with the data storage means;
it includes user prioritising means for hierarchical prioritisation of users, in order to validate or invalidate the access to these data in the event of simultaneous access attempts and/or attempted violation of user prioritisation hierarchy;
it includes user prioritising means for hierarchical prioritisation of users, in order to ban a user in the event of simultaneous access attempts and/or attempts to violate the user prioritisation hierarchy;
it includes means for banning the user for a limited or indefinite time period;
it includes means for banning the user for a time period that may be configured;
the duration of ban when it is not indefinite, may evolve and is characterised in that it is selected from within a group including, inter alia:
  the index of a time window,
  the address of the request issued by the user,
  the identifier of the user,
  the type of user,
  the prioritisation hierarchy of the user or user group,
  the number of temporary bans that have already been instituted and recorded,
the means for temporary alteration and/or deletion of the data are associated with the means for recovery thereof;
the operation of these data recovery means may be triggered based on security related information selected from within a group including, inter alia:
  a list of authorised users allowed to access the data;

a maximum number of allowed accesses to these data, as well as the types of allowed accesses to the said data;

a time window, having a limited allowed duration for access to the said data;

a series/concatenation allowed for access, by various different users, to the said data;

a hierarchical prioritisation of the zones associated with the data storage means;

the data recovery means for recovering the data include the means for the restoring and/or replacing of all or part of the latter.

BRIEF DESCRIPTION OF THE DRAWINGS

The invention will be better understood with the aid of the description that follows, given only by way of example and with reference being made to the attached drawing that represents a block diagram illustrating the structure and the general operation of a security system according to the invention.

The FIGURE block diagram illustrates the general structure of a data security system for securing the critical data of an on-board airplane avionics system in accordance with an example embodiment.

DETAILED DESCRIPTION OF PREFERRED EMBODIMENTS

Indeed illustrated in this FIGURE, is the general structure of a data security system for securing the critical data of an on-board airplane avionics system installed aboard an aircraft for example.

The data are stored in the data storage means denoted by the general reference numeral 1 in this FIGURE.

This system includes the means that form the access interface 2 enabling access by at least one user to these data and the control means for controlling these access instances 3 for the one or more users, such as to validate or invalidate access to the said data on the basis of the security related information thereof.

The security related information of the critical data used in the control means 3 is then present for example in the form of tables or laws, defining in particular conditions of access to the data and may be selected from within a group including, inter alia:

a list of authorised users allowed to access the data;

a maximum number of allowed accesses to these data, as well as the types of allowed accesses to the said data;

a time window, having a limited allowed duration for access to the said data;

a series/concatenation allowed for access, by various different users, to the said data;

a hierarchical prioritisation of the zones associated with the data storage means.

This then provides the ability to control and manage the instances of access to these critical data by one or more users.

The control means 3 are independent of the means that form the access interface 2 and the data storage means 1.

These various different tables or laws may thus be materially presented in the form of programmes implemented at the level of these control means.

The data storage means 1 may be organised by associated discrete elementary zone(s) wherein each one thereof is associated with a message or they may also be presented in the form of different continuous memory storage zones wherein each one thereof is associated with a range of addresses of the data storage means 1.

The security related information of the group described previously and/or the group of security related information may be totally static with a preconfiguration and a preinitialisation or to the contrary, they may be modified in a dynamic manner in accordance with the conditions of access to each of the zones.

This thereby provides for a dynamic management system appropriately adapted to the detection of instances of non-compliance with the conditions or of non-compliant access attempts.

According to one variant, it is also possible to envisage the security related information of the group described previously and/or the group of security related information to be progressively evolving over time.

The means of access control may thus then operationally implement the data alteration means for the temporary or permanent alteration of all or part of the data by using the data deletion means for the temporary or permanent deletion of all or part of the latter.

Thus for example, the system may include the data alteration means for the temporary or permanent alteration of data in the event of non-compliance with the conditions of access or access attempts that are non-compliant with the conditions of access noted above and including in addition:

a list of authorised users allowed to access the data;

a maximum number of allowed accesses to these data, as well as the types of allowed accesses to the said data;

a time window, having a limited duration, allowed for access to the said data;

a series/concatenation allowed for access, by various different users, to the said data; and a hierarchical prioritisation of the zones associated with the data storage means.

Analogous elements may also be used by the data deletion means for the temporary or permanent deletion of all or part of the data.

These means may in addition be used with the user prioritising means for hierarchical prioritisation of users, in order to validate or invalidate the access to these data in the event of simultaneous access attempts and/or attempted violation of user prioritisation hierarchy.

Use may also be made of analogous user prioritising means for hierarchical prioritisation of users, in order to ban a user in the event of simultaneous access attempts and attempts to violate the user prioritisation hierarchy.

This ban may then be a ban for a limited time period or an unlimited time that is an indefinite time period for this user.

It is also possible to envisage the means for banning the user for a time period that may be configured.

This duration of ban when it is not indefinite, may evolve and is for example selected from within a group including, in addition:

the index of a time window, the address of the request issued by the user, the identifier of the user, the type of user, the prioritisation hierarchy of the user or user group, and the number of temporary bans that have already been instituted and recorded.

As has been indicated previously, the means for alteration and/or deletion may be temporary and in this case, these means for alteration and/or deletion may be associated with the means for recovery of the data in whole or in part.

In fact, the operation of these data recovery means may be triggered based on security related information selected from within a group including, inter alia:
a list of authorised users allowed to access the data;
a maximum number of allowed accesses to these data, as well as the types of allowed accesses to the said data;
a time window, having a limited allowed duration for access to the said data;
a series/concatenation allowed for access, by various different users, to the said data; and
a hierarchical prioritisation of the zones associated with the data storage means.

In a general manner, the recovery of data may also be understood as being able to include the restoring and/or the replacement of all or part of these data.

It is thus then conceivable that this makes it possible to greatly improve the security of these data, these data being, as has previously been noted, the critical data that correspond to the data relating to the operation and/or are likely able to compromise the operational safety and security of the aircraft.

These critical data are not to be confused with the data relating to the other functions of the aircraft such as for example, the data relating to the means of entertainment made available to passengers, etc.

The invention claimed is:

1. A data security system for securing critical data of an on-board airplane avionics system installed aboard an aircraft, the data security system comprising:
a hardware data storage unit storing the critical data, which comprises access control units for controlling access, by at least one user, to the critical data, wherein the access control units validate or invalidate access to the critical data on the basis of security related information selected from the group consisting of:
a maximum number of allowed accesses to the critical data, as well as the types of allowed accesses to the critical data;
a time window, having a limited allowed duration for access to the critical data; and
combinations thereof; and
a data alteration module being one of the access control units operable for a temporary or permanent alteration of the critical data in an event of non-compliance with, or access attempts that are non-compliant with, conditions of access selected from the group consisting of:
a maximum number of allowed accesses to the critical data, as well as the types of allowed accesses to the critical data;
a time window, having a limited allowed duration for access to the critical data;
and combinations thereof;
a data deletion module being one of the access control units operable for a temporary or permanent deletion of the critical data in the event of non-compliance with, or access attempts that are non-compliant with, the conditions of access; and
a data recovery module being one of the access control units operably associated with the data alteration module and the data deletion module for recovery of the temporarily altered data by the data alteration module and the temporarily deleted critical data by the data deletion module, each operation of the data recovery module triggered based on the security related information.

2. The system for securing data according to claim 1, wherein the data storage unit is organized:
by associated discrete elementary zone(s), wherein each associated discrete elementary zone is associated with a message; or
in a form of different contiguous zones, wherein each contiguous zone is associated with a range of addresses of the data storage unit.

3. The system for securing data according to claim 1, wherein the security related information is:
totally static with a preconfiguration and a preinitialisation;
modifiable dynamically in accordance with the conditions of access to each of the zones thereby providing for a dynamic management system appropriately adapted to the detection of instances of non-compliance with the conditions or of non-compliant access attempts; or
evolving over time.

4. The system for securing data according to claim 1 further comprising a user prioritising validation/invalidation module being one of the access control units operable for hierarchical prioritization of users to validate or invalidate access to the critical data in an event of simultaneous access attempts or attempted violation of user prioritization hierarchy.

5. The system for securing data according to claim 1 further comprising a user prioritising ban module being one of the access control units operable for hierarchical prioritization of users of ban a user in an event of simultaneous access attempts or attempts to violate user prioritization hierarchy.

6. The system for securing data according to claim 1 further comprising a user time ban module being one of the access control units operable for banning a user for a limited or indefinite time period.

7. The system for securing data according to claim 1 further comprising a user configurable time ban module being one of the access control units operable for banning a user for a configurable time period.

8. The system for securing data according to claim 6, wherein the ban is for a limited time period, the duration of the ban evolves depending upon a factor selected from the group consisting of:
an index of a time window,
an address of the request issued by the banned user,
an identifier of the banned user,
a type of banned user,
a prioritisation hierarchy of the banned user or user group comprising the banner user, and
a number of temporary bans that have already been instituted and recorded.

9. The system for securing data according to claim 1, wherein the data recovery module comprises a data restoration/replacement module being one of the access control units operable for restoring or replacing of all or part of the temporarily altered or temporarily deleted critical data.

10. A data security system for securing critical data of an on-board airplane avionics system installed aboard an aircraft, the data security system comprising:
a hardware data storage unit storing the critical data, which comprises access control units for controlling access, by at least one user, to the critical data, wherein the access control units validate or invalidate access to the critical data on the basis of security related information, the security related information comprising
a time window, having a limited allowed duration for access to the critical data;
and a data alteration module being one of the access control units operable for a temporary or permanent alteration of the critical data in an event of non-compliance with, or access attempts that are non-compliant with, conditions of access, the conditions for access comprising a time window, having a limited allowed duration for access to the critical data;
and
a data recovery module being one of the access control units operably associated with the data alteration module for recovery of the temporarily altered data by the data alteration module, wherein each operation of the data recovery module is triggered based on the security related information.

11. The system for securing data according to claim 10 further comprising a data deletion module being one of the access control units operable for a temporary or permanent deletion of the critical data in the event of non-compliance with, or access attempts that are non-compliant with, the conditions of access.

12. The system for securing data according to claim 11 further comprising the data recovery module being operably associated with the data alteration module and the data deletion module for recovery of the temporarily altered data by the data alteration module and the temporarily deleted critical data by the data deletion module, respectively.

* * * * *